United States Patent [19]
Singer

[11] Patent Number: 5,838,146
[45] Date of Patent: Nov. 17, 1998

[54] METHOD AND APPARATUS FOR PROVIDING ESD/EOS PROTECTION FOR IC POWER SUPPLY PINS

[75] Inventor: Lawrence A. Singer, Bedford, Mass.

[73] Assignee: Analog Devices, Inc., Norwood, Mass.

[21] Appl. No.: 747,217

[22] Filed: Nov. 12, 1996

[51] Int. Cl.[6] ............................. G05F 1/40; H02H 3/20; H02H 9/00

[52] U.S. Cl. ................. 323/270; 361/91; 361/56

[58] Field of Search ............................. 323/270; 361/56, 361/111, 91; 363/50; 357/23.13, 355, 356, 357

[56] References Cited

U.S. PATENT DOCUMENTS

| | | |
|---|---|---|
| 3,819,986 | 6/1974 | Fukuoka . |
| 4,005,342 | 1/1977 | Davis . |
| 4,039,869 | 8/1977 | Goldman . |
| 4,061,928 | 12/1977 | Kessler . |
| 4,066,918 | 1/1978 | Heuner . |
| 4,186,418 | 1/1980 | Seiler . |
| 4,288,829 | 9/1981 | Tango . |
| 4,366,522 | 12/1982 | Baker . |
| 4,385,337 | 5/1983 | Asano et al. ............................ 361/91 |
| 4,400,711 | 8/1983 | Avery . |
| 4,408,245 | 10/1983 | Pryor . |
| 4,456,940 | 6/1984 | Hammerberg . |
| 4,509,067 | 4/1985 | Minami . |
| 4,567,500 | 1/1986 | Avery . |
| 4,580,063 | 4/1986 | Torelli . |
| 4,605,980 | 8/1986 | Hartranft . |
| 4,630,162 | 12/1986 | Bell . |
| 4,631,567 | 12/1986 | Kokado . |
| 4,633,283 | 12/1986 | Avery . |
| 4,678,950 | 7/1987 | Mitake . |
| 4,692,834 | 9/1987 | Iwashashi et al. ....................... 361/91 |
| 4,698,720 | 10/1987 | Finaurini . |
| 4,739,378 | 4/1988 | Ferrari . |
| 4,811,155 | 3/1989 | Kuriyama . |
| 4,819,047 | 4/1989 | Gilfeather . |
| 4,829,350 | 5/1989 | Miller . |
| 4,835,653 | 5/1989 | Zhang . |
| 4,839,768 | 6/1989 | Daniele . |
| 4,855,620 | 8/1989 | Duvvury . |
| 4,858,055 | 8/1989 | Okitaka ........................................ 361/91 |
| 4,868,705 | 9/1989 | Shiochi . |
| 4,870,530 | 9/1989 | Hurst . |
| 4,896,243 | 1/1990 | Chatterjee . |
| 4,930,036 | 5/1990 | Sitch . |
| 4,939,616 | 7/1990 | Rountree . |
| 4,949,212 | 8/1990 | Lenz . |
| 4,996,626 | 2/1991 | Say . |
| 5,034,845 | 7/1991 | Murakami . |
| 5,051,860 | 9/1991 | Lee . |
| 5,086,365 | 2/1992 | Lien . |
| 5,144,519 | 9/1992 | Chang . |

(List continued on next page.)

OTHER PUBLICATIONS

U.S. application No. 08/583,612, Olney, filed Jan. 5, 1996.
U.S. application No. 08/710,183, English, filed Sep. 12, 1996.

Primary Examiner—Peter S. Wong
Assistant Examiner—Rajnikant B. Patel
Attorney, Agent, or Firm—Wolf, Greenfield & Sacks, P.C.

[57] ABSTRACT

An apparatus and method for providing EOS/ESD protection against an EOS/ESD event across first and second pads of an integrated circuit. In one embodiment, the EOS/ESD protection circuit includes an NMOS device having a drain and source respectively coupled to the first and second pads of the integrated circuit, a capacitor coupled between the drain and gate of the NMOS device and a clamping circuit coupled between the gate and the source of the NMOS device to maintain a voltage at the gate less than or equal to a clamping voltage of the clamping circuit. In embodiments of the present invention, the protection circuit includes an active pull down circuit for reducing the voltage across the gate and source of the NMOS device to zero volts a predetermined period of time after the EOS/ESD event, and the protection circuit further includes a current source for providing bias current to the clamping circuit.

34 Claims, 4 Drawing Sheets

U.S. PATENT DOCUMENTS

| | | |
|---|---|---|
| 5,157,573 | 10/1992 | Lee . |
| 5,159,518 | 10/1992 | Roy . |
| 5,196,981 | 3/1993 | Kuo . |
| 5,200,876 | 4/1993 | Takeda . |
| 5,208,719 | 5/1993 | Wei . |
| 5,218,506 | 6/1993 | Harris . |
| 5,237,395 | 8/1993 | Lee . |
| 5,239,400 | 8/1993 | Merrill . |
| 5,239,440 | 8/1993 | Merrill ................................. 361/91 |
| 5,255,146 | 10/1993 | Miller ................................. 361/56 |
| 5,268,588 | 12/1993 | Marum . |
| 5,272,586 | 12/1993 | Yen . |
| 5,276,582 | 1/1994 | Merrill . |
| 5,287,241 | 2/1994 | Puar ................................... 361/56 |
| 5,289,334 | 2/1994 | Ker . |
| 5,291,051 | 3/1994 | Hoang . |
| 5,291,365 | 3/1994 | Takagi . |
| 5,301,084 | 4/1994 | Miller . |
| 5,311,391 | 5/1994 | Dungan . |
| 5,319,259 | 6/1994 | Merrill . |
| 5,333,093 | 7/1994 | Krautschneider . |
| 5,335,134 | 8/1994 | Stein . |
| 5,343,352 | 8/1994 | Nagamine . |
| 5,345,356 | 9/1994 | Pianka . |
| 5,359,211 | 10/1994 | Croft . |
| 5,392,185 | 2/1995 | Haas, Jr. . |
| 5,400,202 | 3/1995 | Metz . |
| 5,406,105 | 4/1995 | Lee . |
| 5,412,527 | 5/1995 | Husher . |
| 5,424,892 | 6/1995 | Topp . |
| 5,426,323 | 6/1995 | Reczek . |
| 5,430,595 | 7/1995 | Wagner . |
| 5,440,162 | 8/1995 | Worley . |
| 5,450,267 | 9/1995 | Diaz et al. ................................. 361/56 |
| 5,452,171 | 9/1995 | Metz . |
| 5,453,900 | 9/1995 | Feldtkeller . |
| 5,455,732 | 10/1995 | Davis . |
| 5,463,520 | 10/1995 | Nelson . |
| 5,473,500 | 12/1995 | Payne . |
| 5,477,413 | 12/1995 | Watt . |
| 5,477,414 | 12/1995 | Li . |
| 5,479,039 | 12/1995 | Lien . |
| 5,495,118 | 2/1996 | Kinoshita . |
| 5,528,723 | 6/1996 | Wolfe . |
| 5,602,409 | 2/1997 | Olney . |

METHOD AND APPARATUS FOR PROVIDING ESD/EOS PROTECTION FOR IC POWER SUPPLY PINS

BACKGROUND OF THE INVENTION

1. Field of the Invention

The present invention relates generally to integrated circuits, and more particularly, to a method and apparatus for protecting integrated circuits from electrical overstress and electrostatic discharge.

2. Discussion of the Related Art

Electrical over stress (EOS) of an integrated circuit generally results from an external source discharging large transient voltages typically over a short period of time onto a terminal or pin of the integrated circuit. EOS events include very fast transients such as electrostatic discharge (ESD), and slower transients produced by power line glitches or dropouts.

Electrostatic discharge or ESD is a well-known cause of operation failure of integrated circuits. The buildup of electrostatic charge on personnel and equipment during the manufacture and use of integrated circuits may assume potentials as high as 30,000 volts with respect to an ESD reference point. The built-up charge may be discharged through an integrated circuit when either the personnel or the equipment comes in contact with the integrated circuit. The electrostatic discharge may occur during manufacturing or testing when the integrated circuit is non-operating, or it may occur when the integrated circuit is installed in a device and is operating. Integrated circuits are particularly susceptible to ESD damage during handling in a manufacturing, testing or printed circuit board assembly environment.

An electrostatic discharge through an integrated circuit can permanently damage the integrated circuit through several failing mechanisms, including the dielectric breakdown of oxides and other thin layers, the melting of conductive material such as polysilicon or aluminum, and the melting of semiconductive material such as silicon, resulting in excessive leakage currents and open or short circuits in the integrated circuit.

Integrated circuits containing metal oxide semiconductor (MOS) transistors are particularly sensitive to electrostatic discharge at the input, output and supply pins. Several approaches to EOS/ESD protection circuits have been developed to protect MOS transistors and circuits from EOS/ESD events at their input, output and supply pins. FIG. 1 shows a prior art EOS/ESD protection circuit 10 that utilizes an NMOS protection device 12 coupled between a pad 16 and a pad 18 of an integrated circuit to be protected. The pad 16 is typically a supply voltage pad and the pad 18 is typically a ground reference pad. The NMOS device 12 has a source 12s connected to the reference node 18, a drain 12d connected to the pad 16 and a gate 12g coupled through a resistor 14 to the reference node 18.

During an EOS/ESD event at pad 16, the drain-to-substrate junction of NMOS device 12 exhibits a reverse breakdown and conducts current to the substrate. When a sufficiently large current flows in the substrate, the local substrate potential is raised high enough to trigger a parasitic bipolar (NPN) transistor within NMOS device 12 into avalanche breakdown. The voltage across the transistor drops to a lower voltage, equal to the open-base, collector-emitter breakdown voltage of the NPN transistor referred to as $BV_{ceo}$. The avalanching NPN transistor serves to limit the voltage across the device 12, and discharges the EOS/ESD event from pad 16 to reference node 18 through a number of channels or "fingers" that are formed in the device. This breakdown phenomenon of the NMOS device and its associated parasitic bipolar NPN transistor is referred to as snapback and the voltage at which this occurs is referred to as the trigger voltage. When the trigger voltage is exceeded, snapback occurs and the voltage from the drain to the source of the NMOS device is clamped to a voltage (referred to as the snapback voltage, or $BV_{ceo}$) that is less than the trigger voltage. This reverse breakdown process is described in greater detail in U.S. Pat. No. 4,855,620 to Duvvury et al.

There are several drawbacks associated with the NMOS protection device shown in FIG. 1. The parasitic parameters of NMOS devices typically are not well controlled, and accordingly, the voltage and current at which NMOS devices will exhibit snapback are not well controlled. Further, individual fingers within an NMOS device will turn on at different times in response to an EOS/ESD event. This results in non-uniform distribution of discharge current through the NMOS device and causes localized "hot" spots which may damage the NMOS device by causing a secondary breakdown of the device to occur. To compensate for the above-described limitations, the prior art NMOS protection devices typically are relatively large, to allow for parallel discharge of an EOS/ESD event through a plurality of fingers to reduce localized heating.

The EOS/ESD protection circuit 10 shown in FIG. 1 is referred to as a grounded-gate NMOS device (GGNMOS), as the gate of the NMOS device is coupled to ground through a resistor as shown in FIG. 1. Gate-coupled NMOS devices (GCNMOS) have also been used in prior art circuits to provide EOS/ESD protection. In a GCNMOS device, the gate of the NMOS device is coupled to the drain of the NMOS device such that the voltage at the gate and drain are simultaneously increased when an EOS/ESD event occurs at a pad connected to the drain.

GCNMOS devices are known to provide improved EOS/ESD protection over GGNMOS devices because they have lower trigger voltages and can achieve uniform snapback throughout all fingers of a multi-fingered protection device. The simultaneous application of gate voltage and drain voltage in the GCNMOS device causes hot electrons to be generated that flow from the drain to the substrate of the NMOS device and thereby raise the local substrate potential. When sufficient current flows in the substrate, the parasitic NPN transistor is triggered into avalanche breakdown in much the same way as in the GGNMOS device described previously. However, since the substrate current in the GCNMOS device is generated by hot electrons (rather than reverse breakdown in the GGNMOS device), the drain voltage necessary to trigger avalanche breakdown (snapback) in the NPN transistor may be as much as five to seven volts less than the trigger voltage of a GGNMOS device. In GCNMOS devices, substrate current is produced throughout the NMOS device (rather than locally as in GGNMOS devices) causing all fingers of a multifinger device to turn on simultaneously, thereby reducing the likelihood of the formation of local hot spots and the occurrence of secondary breakdown.

It is known that the optimal gate voltage for lowering the trigger voltage of a gate-coupled NMOS device is approximately 1.5 to 4 volts (depending on the device technology that is used), and that voltages outside of this range result in fewer hot electrons, and less robustness of the EOS/ESD protection device. This is discussed in greater detail in "Dynamic Gate Coupling of NMOS for Efficient Output ESD Protection by Duvvury and Diaz", 1992 IEEE/IRPS.

Duvvury and Diaz also teach that to further enhance the performance of a gate-coupled NMOS device, and to reduce stress to the device, the gate voltage should be reduced to zero after snapback has occurred. The Duvvury and Diaz reference discloses a gate-coupled NMOS EOS/ESD protection device 20 as shown in FIG. 2. The EOS/ESD protection device 20 includes a gate-coupled NMOS device 22 having a drain 22d connected to a first pad 26, and a source 22s connected to a second pad 28. The gate 22g of NMOS device 22 is coupled to pad 28 through a resistor 24, and the gate is also coupled to pad 26 through a capacitor 25.

The EOS/ESD protection device 20 provides protection against an EOS/ESD event at pad 26 having a positive polarity with respect to pad 28. When such an event occurs, the potential of the gate of NMOS device 20 rises with the potential at the drain of gate 20. The values of the capacitor 25 and the resistor 24 are selected to provide a time constant of approximately 15 nanoseconds, corresponding to the typical rise time of an ESD event. Once capacitor 25 becomes fully charged, and there is no current through resistor 24, the potential at the gate of NMOS device 22 is reduced to zero.

There are several disadvantages with the EOS/ESD protection device 20 of FIG. 2. As discussed above, it is desirable to maintain the gate voltage in the range of 1.5 to 4 volts during the ESD event; however, the EOS/ESD device 20 provides little control over the gate voltage. This is particularly true when the EOS/ESD device is intended to provide protection against EOS/ESD events of varying amplitudes and rise times. To achieve a rapid snapback of the NMOS device during both low and high voltage ESD events, the capacitor 25 should have relatively high capacitance in order to couple a large fraction of the drain potential to the gate. However, when a large capacitor is used, and a large EOS or ESD event occurs, the gate voltage of the NMOS device may be raised to a voltage much greater than 4 volts and maintained at a relatively high voltage even after snapback of the NMOS device has occurred, thereby degrading the EOS/ESD robustness of the device.

If a capacitor having relatively low capacitance is used for capacitor 25, then the effects of parasitic capacitance between the gate 22g and the source 22s of NMOS device 22 become more pronounced. This parasitic capacitance between the gate and source is not typically well-controlled in the manufacturing of NMOS devices, and therefore, the magnitude and the extent of duration of the EOS/ESD voltage at the gate is also not well-controlled.

SUMMARY OF THE INVENTION

Embodiments of the present invention overcome drawbacks of EOS/ESD protection circuits of the prior art by providing a gate-coupled NMOS protection circuit in which the voltage at the gate of the NMOS device is precisely controlled.

In a first embodiment of the present invention, an EOS/ESD protection circuit includes an EOS/ESD protection device having first and second inputs and an output, a capacitor coupled between the first and second inputs of the EOS/ESD protection device, and a clamping circuit having an input coupled to the second input of the EOS/ESD protection device and having an output coupled to the output of the EOS/ESD protection device, the clamping circuit being constructed to clamp a voltage across the second input and the output of the EOS/ESD protection device to a predetermined value.

In one version of the first embodiment, the EOS/ESD protection circuit further includes a resistor coupled between the second input and the output of the EOS/ESD protection device.

In another version of the first embodiment, the clamping circuit includes at least one diode having an anode coupled to the second input of the EOS/ESD protection device and having a cathode coupled to the output of the EOS/ESD protection device.

In yet another version of the first embodiment, the EOS/ESD protection device consists of an NMOS device, and the first input, the second input and the output of the EOS/ESD protection device respectively correspond to the drain, the gate and the source of the NMOS device.

In a second embodiment of the present invention, the EOS/ESD protection circuit of the first embodiment further includes an active pull down circuit coupled to the first input, the second input and the output of the EOS/ESD protection circuit. The active pull down circuit is constructed to reduce the voltage across the second input to the output of the EOS/ESD protection circuit to substantially zero volts at a predetermined time after the EOS/ESD event.

In one version of the second embodiment, the active pull down circuit includes a switch having a first input coupled to the second input of the EOS/ESD protection circuit, a second input, and an output. The switch is constructed to provide substantially a short circuit between the first input and the output of the switch in response to a control signal received at the second input of the switch. The active pull down circuit further includes a timer circuit that provides the control signal to the switch at the predetermined time.

In a third embodiment of the present invention, the second embodiment further includes a current source to provide bias current to the clamping circuit. The current source is coupled between the first and second inputs of the EOS/ESD protection device.

In one version of the third embodiment, the current source has a control input coupled to the output of the timer circuit such that the current source is turned off at the predetermined time after the EOS/ESD event.

In a fourth embodiment of the present invention, an EOS/ESD protection circuit includes an EOS/ESD protection device having first and second inputs and an output, a capacitor coupled between the first and second inputs of the EOS/ESD protection device, and means for maintaining a voltage across the second input and the output of the EOS/ESD protection device at a first predetermined level for a predetermined period of time after the occurrence of the EOS/ESD event.

In one version of the fourth embodiment, the EOS/ESD protection circuit further includes means for maintaining the voltage across the second input and the output of the EOS/ESD protection device at a second predetermined level after the predetermined period of time.

A fifth embodiment of the present invention is directed to a method for protecting an integrated circuit having first and second input pads from an EOS/ESD event. The method includes steps of providing an EOS/ESD protection device having a first input to couple to the first pad, having an output to couple to the second pad, and having a second input, the EOS/ESD protection device being constructed to conduct current from the first input to the output upon occurrence of the EOS/ESD event, and upon the occurrence of the EOS/ESD event, setting a voltage across the second input and the output of the EOS/ESD protection device to a first predetermined level for a predetermined period of time.

In one version of the fifth embodiment, the method further includes a step of setting the voltage across the second input and the output of the EOS/ESD protection device to a second predetermined level after the predetermined period of time.

BRIEF DESCRIPTION OF THE DRAWINGS

In the drawings, which are incorporated herein by reference and in which like elements have been given like reference characters.

DETAILED DESCRIPTION

For purposes of illustration only, and not to limit generality, the present invention will now be explained with reference to an integrated circuit having EOS/ESD protection. One skilled in the art will appreciate, however, that embodiments of the present invention are not limited to integrated circuits, but rather, the EOS/ESD protection circuits in accordance with embodiments of the present invention may be used in other applications to protect sensitive components from the effects of EOS/ESD events.

Figure 3:
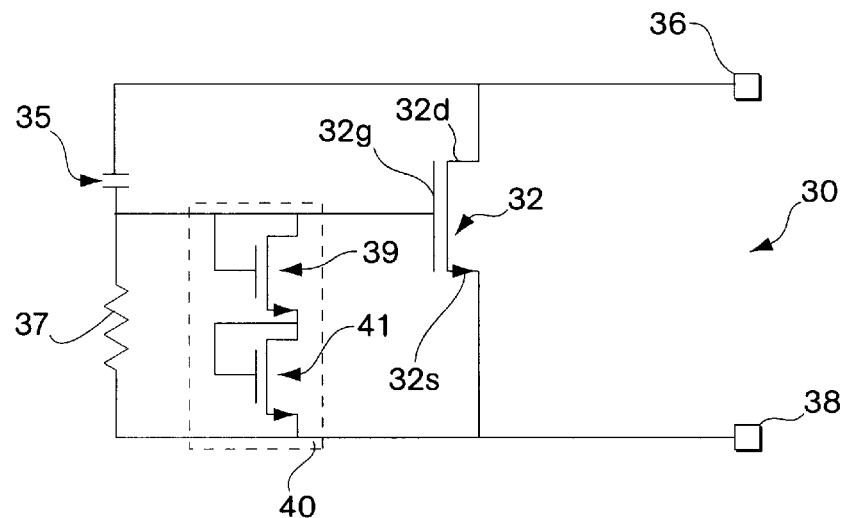
FIG. 3 is a schematic diagram of an EOS/ESD protection circuit in accordance with a first embodiment of the present invention.

With reference to FIG. 3, a first embodiment of an EOS/ESD protection circuit 30 in accordance with the present invention will now be described. The EOS/ESD protection circuit 30 provides EOS/ESD protection for an integrated circuit against an EOS/ESD event occurring across pads 36 and 38 of the integrated circuit. The pad 36 is for coupling to a supply voltage and the pad 38 is for coupling to a reference voltage (i.e., ground). The EOS/ESD protection circuit 30 includes an NMOS device 32 having its drain 32d connected to pad 36 and its source 32s connected to pad 38, a capacitor 35 connected between pad 36 and the gate 32g of the NMOS device 32, a resistor 37 connected between the gate 32g and pad 38, and a clamping circuit 40 connected between the gate 32g of the NMOS device 32 and pad 38. The clamping circuit 40 in a preferred embodiment of the invention is comprised of two diode-connected NMOS devices 39 and 41 that limit the voltage across the gate and the source 32s of the NMOS device 32 to a predetermined value. The capacitor 35 in one embodiment is implemented using a MOS device.

Figure 1:
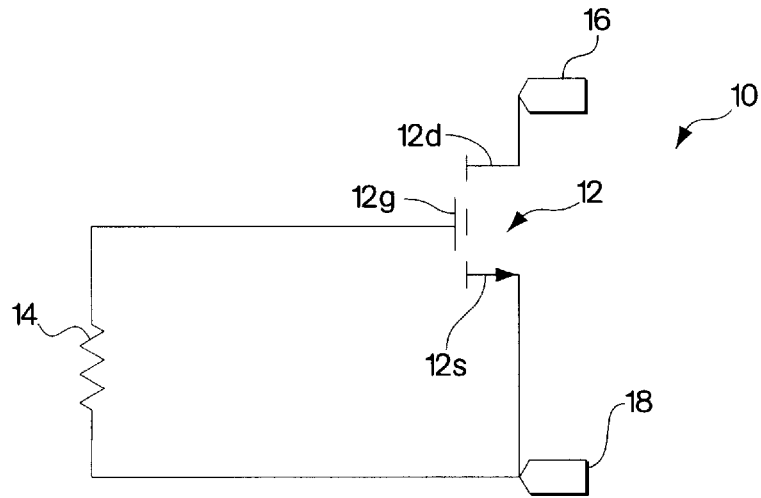
FIG. 1 is a schematic diagram of a grounded-gate NMOS EOS/ESD protection circuit of the prior art.
Figure 2:
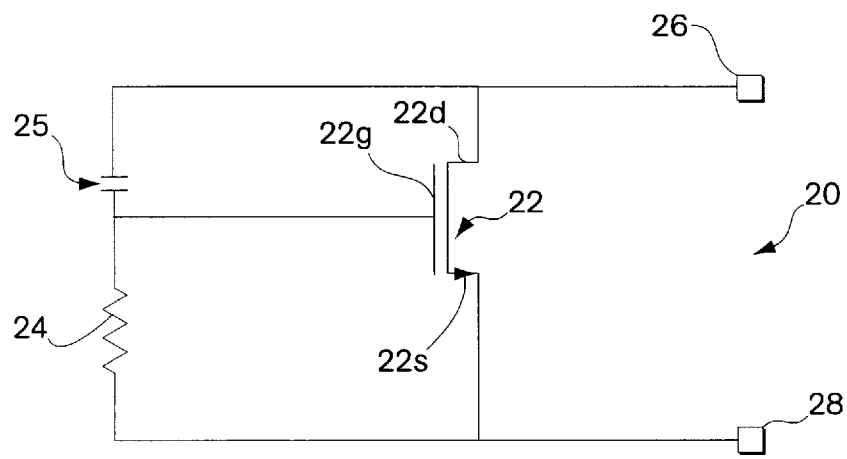
FIG. 2 is a schematic diagram of a gate-coupled NMOS EOS/ESD protection circuit of the prior art.

The EOS/ESD protection circuit 30 of FIG. 3 operates similar to the EOS/ESD protection circuit 20 of FIG. 2, except that the clamp 40 limits the voltage across the gate 32g and the source 32s of the NMOS device 32 to a predetermined value, which is equal to the optimum gate voltage (designated as $V_g$) for inducing snapback of the NMOS device 32. In one embodiment of the present invention $V_g$ is approximately 3 volts. Since the clamp 40 prevents the voltage across the gate and source from exceeding 3 volts, relatively large values can be used for capacitor 35 and resistor 37 without concern that the voltage at gate 32g will become excessive and reduce the robustness of the NMOS device 32. The use of the clamp 40 to limit the voltage across the gite and the source of the NMOS device 32 allows the EOS/ESD protection circuit 30 to provide protection for the integrated circuit for a wide range of EOS/ESD events without providing excessive stress to the NMOS device 32. Resistor 37 is provided to discharge the gate voltage to zero after the NMOS device enters snapback.

The use of the clamp 40 reduces the stress on the NMOS device 32, and all circuits protected by device 32, by limiting the gate voltage to the optimum voltage $V_g$ as described above. In the prior art gate-coupled protection circuit, described above with reference to FIG. 2, the voltage at the gate of the NMOS device will typically exceed the desired gate voltage during an EOS/ESD event. When the gate voltage is away from the optimum (between 1.5 volts and 4 volts), fewer hot electrons are produced. Thus, the NMOS device 32 enters snapback at a higher voltage, which will increase the stress to the protection device and to circuits protected by the device, and thereby lower their robustness. In addition, a large gate potential will stress the gate oxide and further reduce the robustness of the protection device. When the gate voltage of device 32 falls in the 1.5–4 volt range, production of hot electrons is maximized and the snapback trigger voltage is minimized, leading to increased robustness of the protection device and all circuits protected by it.

Figure 4A:
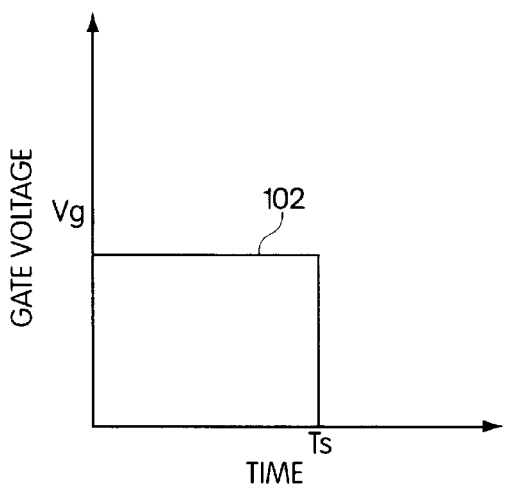
FIGS. 4A–4F show plots of gate voltage verses time for prior art protection circuits and for protection circuits in accordance with embodiments of the present invention.

FIG. 4A shows the ideal gate voltage curve 102 verses time for reducing the trigger voltage of an NMOS device. As shown in FIG. 4A, ideally, the gate voltage should be maintained at voltage $V_g$ for a time $t_s$ corresponding to the time required for the NMOS device to enter snapback, and the gate voltage should be reduced to zero upon the occurrence of snapback. If the gate voltage exceeds the curve 102 shown in FIG. 4A during an EOS/ESD event, then unnecessary stress to the device occurs, reducing the robustness of the device.

Figure 4B:
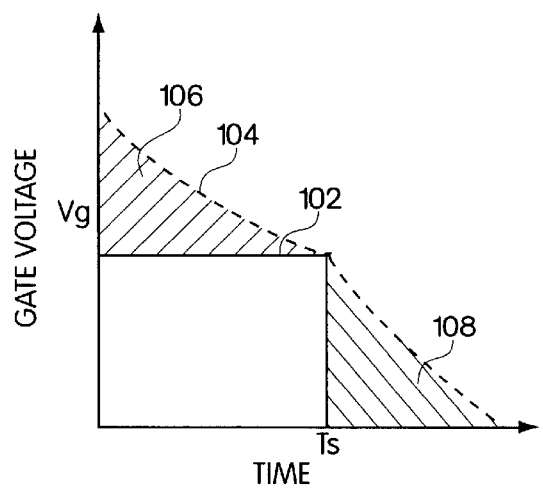

FIG. 4B shows the gate voltage curve 104 for the NMOS device in the prior art protection circuit 22 of FIG. 2 along with the ideal gate voltage curve 102 of FIG. 4A. As shown in FIG. 4B, the gate voltage of the NMOS device in the prior art protection circuit exceeds the ideal curve both prior to snapback (in the area identified with reference numeral 106) and after snapback has occurred (in the area identified with reference numeral 108), causing unnecessary stress to the NMOS device. Depending on the values chosen for the resistor 24 and the capacitor 25, and accordingly, the resulting time constant of the circuit, one of areas 106 and 108 of FIG. 4B can be reduced; however, this results in an increase of the other area.

Figure 4C:
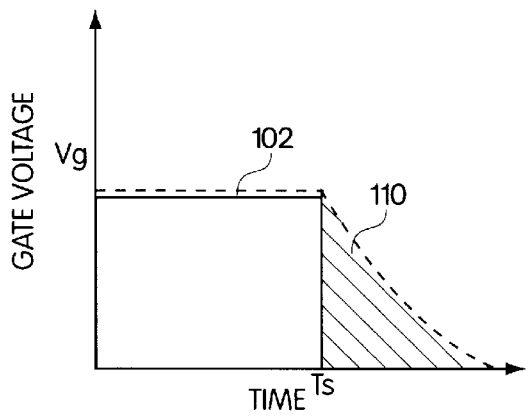
Figure 4D:
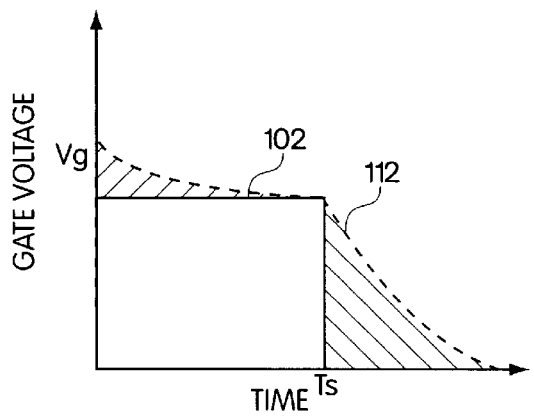

FIG. 4C shows the gate voltage curve for the NMOS device 32 in the embodiment of the present invention shown in FIG. 3 for an ideal voltage clamp having a clamping voltage equal to $V_g$. As shown in FIG. 4C, the stress to the NMOS device prior to snapback is completely reduced. The stress after snapback has occurred remains, and may in fact be greater depending on the values chosen for resistor 37 and capacitor 35. FIG. 4C shows the curve of the gate voltage verses time for an ideal clamp. In actuality, the series-connected diode configuration shown in FIG. 3, will have a clamping voltage that varies with current through the clamp and the clamping voltage is selected such that the gate voltage will be slightly greater than $V_g$ prior to snapback to ensure that snapback occurs. FIG. 4D shows a more accurate approximation of the gate voltage curve 112 for the NMOS device in the embodiment of the present invention shown in FIG. 3.

Figure 5:
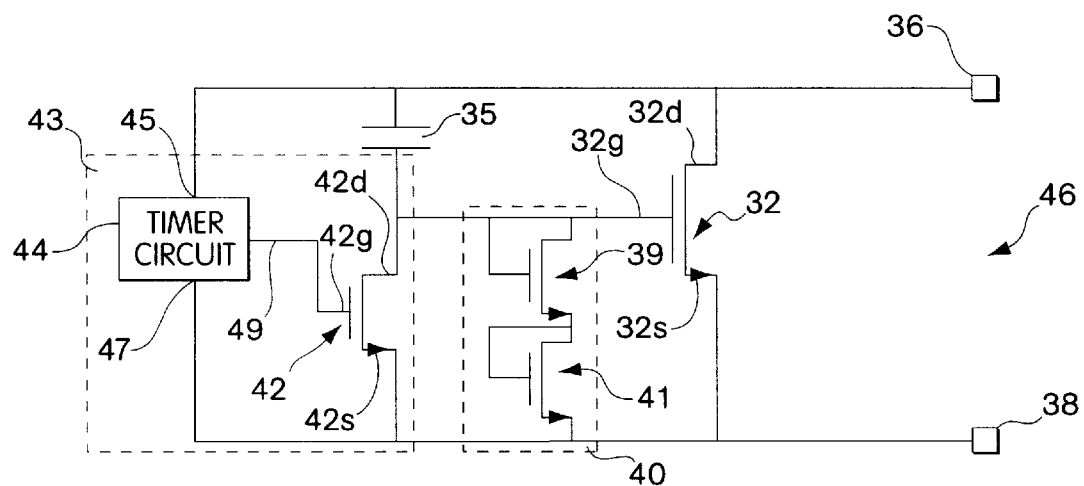
FIG. 5 is a schematic diagram of an EOS/ESD protection circuit in accordance with a second embodiment of the present invention.

FIG. 5 shows a second embodiment of an EOS/ESD protection circuit 46 in accordance with the present invention. The EOS/ESD protection circuit 46 is similar to EOS/ESD protection circuit 30 except that the resistor 37 of protection circuit 30 is replaced by an active pull down circuit 43 consisting of an NMOS device 42 and a timer circuit 44. The NMOS device 42 has a drain 42d connected to the gate 32g of NMOS device 32, a source 42s connected to pad 38 and a gate 42g connected to the output of the timer circuit 44. The timer circuit 44 has inputs 45 and 47 connected respectively to pads 36 and 38 to detect an EOS/ESD event, and the timer circuit has an output 49 connected to the gate of the NMOS device 42.

Upon the occurrence of an EOS/ESD event across pads 36 and 38, EOS/ESD protection circuit 46 initially operates in a similar manner to EOS/ESD protection circuit 30 discussed above to raise the voltage at the gate 32g of the NMOS device 32 to approximately 3 volts. The timer circuit 44 in conjunction with NMOS device 42 is used to bring the voltage at the gate 32g to zero a predetermined period of time after the occurrence of the EOS/ESD event. The output 49 of the timer circuit is initially at a low state (i.e. ground). The timer circuit detects the occurrence of the EOS/ESD event across inputs 45 and 47 and switches the output 49 to a high state a predetermined period of time after the occurrence of the EOS/ESD event. When the output 49 of timer 44 goes high, NMOS device 42 turns on, coupling the gate of NMOS device 32 to pad 38 to reduce the stress to NMOS device 32. Ideally, the predetermined time is set to equal the snapback time $t_s$; however, to ensure that snapback does occur, the predetermined time of the timer is set to a value slightly greater than $t_s$. In a preferred embodiment of the present invention, the timer circuit 44 is configured such that the predetermined time is approximately 15 nanoseconds.

Figure 4E:
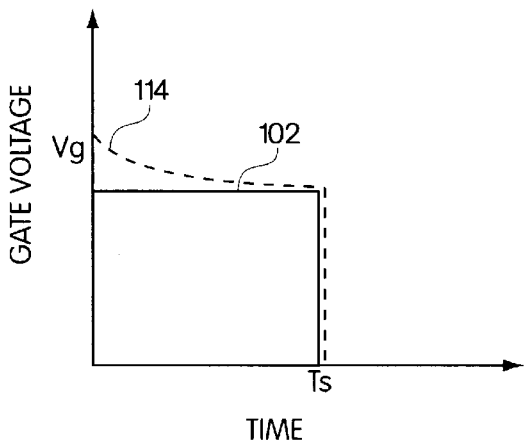

As discussed above, the robustness of the NMOS device 32 to EOS/ESD events is enhanced by reducing the gate voltage to zero after snapback of the device has occurred. In the embodiment of the present invention shown in FIG. 5, the gate voltage is reduced to zero, at a predetermined time which can be set equal to the time required for the NMOS device 32 to exhibit snapback for a typical ESD event. The embodiment of the present invention shown in FIG. 5 overcomes the drawbacks of the prior art protection circuits discussed above with reference to FIG. 2 by providing a gate-coupled NMOS device in which the voltage level at the gate is precisely controlled and in which the duration of the voltage at the gate is also precisely controlled. FIG. 4E shows the gate voltage curve 114 for the embodiment of the invention shown in FIG. 5. As shown in FIG. 4E, the stress on NMOS device 32 due to voltage at the gate 32g after snapback has occurred is essentially eliminated by adding the active pull-down device.

In the embodiment of the present invention shown in FIG. 5, the EOS/ESD protection circuit 46 includes an active pull down circuit 43 consisting of timer circuit 44 and NMOS device 42, incorporated with the EOS/ESD protection circuit 30 of FIG. 3. As understood by those skilled in the art, the active pull down circuit 43 may be incorporated into the prior art protection circuit 20 of FIG. 2 to reduce the voltage at gate 22g at a more controlled time period after the occurrence of the EOS/ESD event than is provided by the resistor 24 alone.

As discussed above, in a preferred embodiment of the present invention, the clamp 40 is configured using two diode-connected NMOS devices. Alternatively, the clamp could be implemented using a different number of diodes, a zener diode or other circuit elements to limit the gate voltage to the predetermined value.

Figure 6:
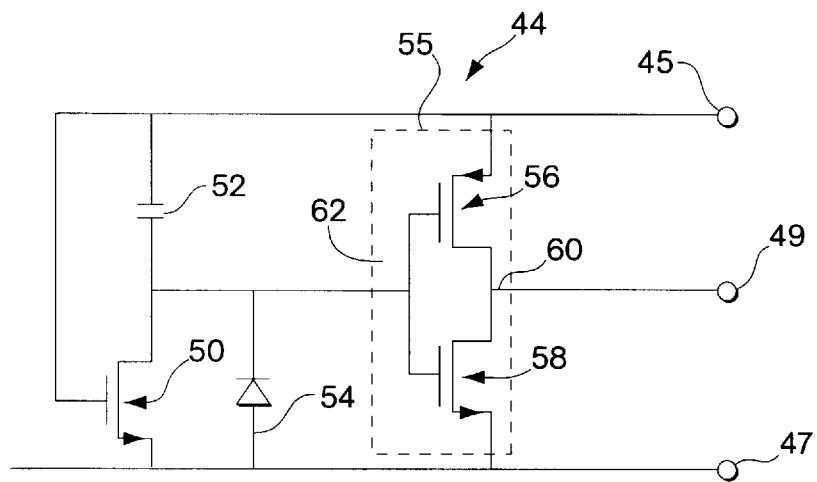
FIG. 6 is a schematic diagram of a timer circuit used in the second embodiment of the present invention.

FIG. 6 shows a more detailed schematic diagram of the timer circuit 44 in a preferred embodiment of the present invention. The timer circuit 44 includes an inverter 55 consisting of a PMOS device 56 and an NMOS device 58 connected in series between the inputs 45 and 47 of the timer circuit. The output 60 of the inverter is coupled to the output 49 of the timer circuit. A capacitor 52 is connected between the input 62 of the inverter and the input 45 of the timer circuit. In a preferred embodiment, the capacitor 52 is implemented using a PMOS device configured as a capacitor. An NMOS device 50, configured as a current source, is coupled between the input 62 of the inverter and the input 47 of the timer circuit. A diode 54 has its anode connected to input 47 of the timer circuit and its cathode connected to the input 62 of the inverter circuit 55. In a preferred embodiment, diode 54 is an intrinsic diode within NMOS device 50.

The timer circuit 44 operates as follows. Upon the occurrence of an EOS/ESD event at the input 36 of the EOS/ESD protection circuit (see FIG. 5), the voltage at the input 62 of the inverter circuit 55 initially follows the voltage at input 36. With the input to the inverter at a high state, the voltage at the output 60 of the inverter, and hence at the output 49 of the timer circuit is low (at ground potential). Thus, the pull-down NMOS device 42 is initially off. The NMOS device 50 draws current through capacitor 52 to charge capacitor 52. As capacitor 52 charges, the voltage at the input 62 of the inverter decreases. When the voltage at input 62 drops below the threshold level of the inverter 55, the output of the inverter switches from low to high, turning on the pull-down device 42. The value of the capacitor is chosen based on the size of the NMOS device 50 such that the pull-down NMOS device 42 turns on approximately 15 nanoseconds after the start of the EOS/ESD event. In a preferred embodiment, the value of the capacitor 52 is 2 picofarads. The diode 54 is used to discharge the capacitor 52 when the voltage at the input 45 of the timer circuit 44 decreases to zero rapidly. This resets the timer circuit and allows the protection circuit to function properly even when several EOS/ESD events occur in rapid succession.

Figure 4F:
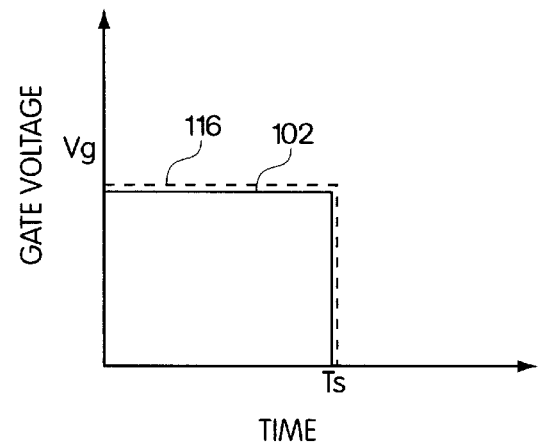
Figure 7:
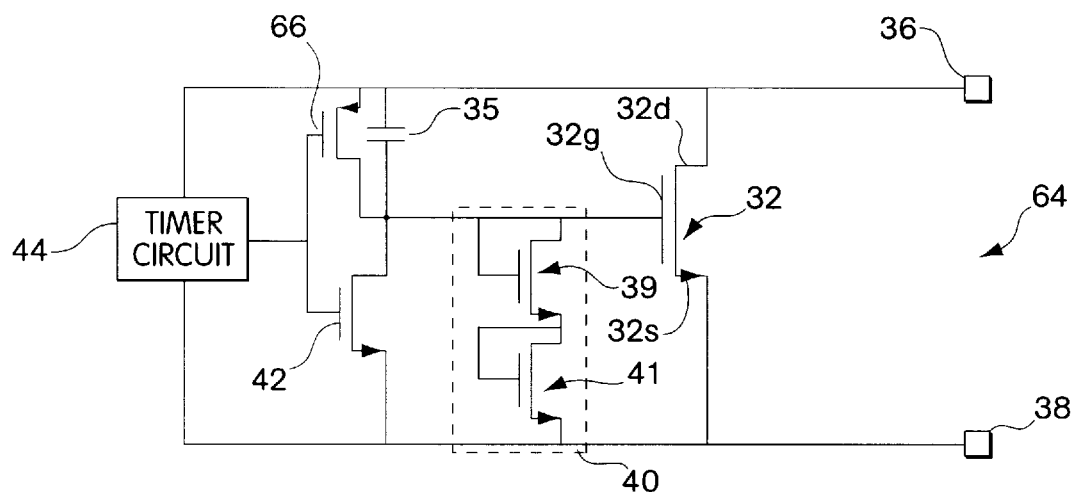
FIG. 7 is a schematic diagram of an EOS/ESD protection circuit in accordance with a third embodiment of the present invention.

FIG. 7 shows a third embodiment of an EOS/ESD protection circuit 64. EOS/ESD protection circuit 64 is similar to EOS/ESD protection circuit 46 shown in FIG. 5 except that an additional PMOS device 66 has been added. PMOS device 66 has its source coupled to the input 36 of the protection circuit, its drain coupled to the gate of NMOS device 30 and its gate coupled to the output of the timer circuit 44. PMOS device 66 is configured to act as a current source when the output of the timer circuit 44 is low to provide a trickle current through the clamp circuit 40. PMOS device 66 is turned off when the output of the timer circuit switches to the high state. The trickle current maintains the clamping voltage of the clamp circuit 40 essentially constant prior to the occurrence of snapback of NMOS device 32. Accordingly, the clamping voltage can be set approximately equal to the desired gate voltage. FIG. 4F shows the gate voltage curve 116 for the embodiment of the invention shown in FIG. 7. By comparing the gate voltage curve of FIG. 4F with the gate voltage curve of FIG. 4E, it can be seen that the PMOS device 66 reduces the stress on the NMOS device 32 prior to the occurrence of snapback.

ESD testing has been conducted on integrated circuits using the prior art EOS/ESD protection circuit 10 and on similar integrated circuits using the EOS/ESD protection circuit 64 shown in FIG. 7. The integrated circuits utilizing the prior art protection device exhibited failure to ESD events with a threshold level between 500 volts and 1000 volts. The integrated circuits utilizing the EOS/ESD protection circuit 64 exhibited a substantially higher threshold level of greater than 2000 volts and as high as 4000 volts.

Embodiments of the present invention overcome limitations of prior art EOS/ESD protection devices by precisely controlling the gate voltage of an NMOS protection device to limit the stresses on the NMOS device such that the NMOS device is more robust and can repeatedly discharge larger EOS/ESD events without using special processing or masking steps to produce the NMOS device.

In embodiments of the present invention, EOS/ESD protection circuits have been described as including a capacitor coupled between the drain and the source of an NMOS EOS/ESD protection device. As understood by those skilled in the art, depending on the value chosen, the capacitor may be the intrinsic drain to gate capacitance of the NMOS protection device.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An EOS/ESD protection circuit for protecting an integrated circuit from an EOS/ESD event occurring across first and second pads of the integrated circuit, the EOS/ESD protection circuit comprising:
   an EOS/ESD protection device having a first input to couple to the first pad, having an output to couple to the second pad, and having a second input, the EOS/ESD protection device being constructed to conduct current from the first input to the output upon occurrence of the EOS/ESD event;
   a capacitor coupled between the first input and the second input of the EOS/ESD protection device; and
   a clamping circuit having an input coupled to the second input of the EOS/ESD protection device and having an output coupled to the output of the EOS/ESD protection device, the clamping circuit being constructed to clamp a voltage across the second input and the output of the EOS/ESD protection device to a predetermined non-zero value upon occurrence of the EOS/ESD event.

2. The EOS/ESD protection circuit of claim 1, further comprising a resistor connected between the second input and the output of the EOS/ESD protection circuit.

3. The EOS/ESD protection circuit of claim 1, further comprising an active pull down circuit having first and second inputs respectively coupled to the first input and the output of the EOS/ESD protection device and having an output coupled to the second input of the EOS/ESD protection device, the active pull down circuit being constructed and arranged to reduce the voltage across the second input and the output of the EOS/ESD protection circuit to approximately zero at a predetermined time after the occurrence of the EOS/ESD event.

4. The EOS/ESD protection circuit of claim 3, further comprising a current source to provide bias current to the clamping circuit, the current source having a first input coupled to the first input of the EOS/ESD protection device, and having an output coupled to the second input of the EOS/ESD protection device.

5. The EOS/ESD protection circuit of claim 4, wherein the EOS/ESD protection device is an NMOS device, and wherein the first input, the second input and the output of the EOS/ESD protection device respectively correspond to the drain, gate and source of the NMOS device.

6. The EOS/ESD protection circuit of claim 5, wherein the clamping circuit includes at least one diode coupled between the gate of the NMOS device and the source of the NMOS device.

7. The EOS/ESD protection circuit of claim 6, wherein the active pull down circuit includes:
   a switch having a first input coupled to the gate of the NMOS device, a second input, and an output coupled to the source of the NMOS device, the switch being constructed to provide a substantially short circuit between the first input and the output of the switch in response to a control signal at the second input of the switch; and
   a timer circuit having first and second inputs respectively coupled to the drain and source of the NMOS device and an output coupled to the second input of the switch to provide the control signal at the predetermined time.

8. The EOS/ESD circuit of claim 7, wherein the current source has a control input coupled to the output of the timer circuit to receive the control signal to turn the current source off at the predetermined time after the EOS/ESD event.

9. The EOS/ESD circuit of claim 8 in combination with the integrated circuit.

10. The EOS/ESD protection circuit of claim 2, further comprising a current source to provide bias current to the clamping circuit, the current source having a first input coupled to the first input of the EOS/ESD protection device, and having an output coupled to the second input of the EOS/ESD protection device.

11. The EOS/ESD protection circuit of claim 10, wherein the EOS/ESD protection device is an NMOS device, and wherein the first input, the second input and the output of the EOS/ESD protection device respectively correspond to the drain, gate and source of the NMOS device.

12. The EOS/ESD protection circuit of claim 11, wherein the clamping circuit includes at least one diode coupled between the gate of the NMOS device and the source of the NMOS device.

13. The EOS/ESD protection circuit of claim 1, wherein the EOS/ESD protection device is an NMOS device, and wherein the first input, the second input and the output of the EOS/ESD protection device respectively correspond to the drain, gate and source of the NMOS device.

14. The EOS/ESD protection circuit of claim 13, wherein the clamping circuit includes at least one diode coupled between the gate of the NMOS device and the source of the NMOS device.

15. The EOS/ESD protection circuit of claim 14, further comprising a current source to provide bias current to the clamping circuit, the current source having a first input coupled to the first input of the EOS/ESD protection device, and having an output coupled to the second input of the EOS/ESD protection device.

16. The EOS/ESD protection circuit of claim 1, further comprising a current source to provide bias current to the clamping circuit, the current source having a first input coupled to the first input of the EOS/ESD protection device, and having an output coupled to the second input of the EOS/ESD protection device.

17. The EOS/ESD protection circuit of claim 1 in combination with the integrated circuit.

18. An EOS/ESD protection circuit for protecting an integrated circuit from an EOS/ESD event, having a pulse duration, occurring across first and second pads of the integrated circuit, the EOS/ESD protection circuit comprising:

an EOS/ESD protection device having a first input to couple to the first pad, having an output to couple to the second pad, and having a second input, the EOS/ESD protection device being constructed to conduct current from the first input to the output upon occurrence of the EOS/ESD event;

a capacitor coupled between the first input and the second input of the EOS/ESD protection device; and an active pull down circuit having first and second inputs respectively coupled to the first input and the output of the EOS/ESD protection device and having an output coupled to the second input of the EOS/ESD protection device, the active pull down circuit being constructed and arranged to reduce the voltage across the second input and the output of the EOS/ESD protection device to approximately zero at a predetermined time after the occurrence of the EOS/ESD event, wherein the predetermined time is less than the pulse duration.

19. An EOS/ESD protection circuit for protecting an integrated circuit from an EOS/ESD event occurring across first and second pads of the integrated circuit, the EOS/ESD protection circuit comprising:

an EOS/ESD protection device having a first input to couple to the first pad, having an output to couple to the second pad, and having a second input, the EOS/ESD protection device being constructed to conduct current from the first input to the output upon occurrence of the EOS/ESD event;

a capacitor coupled between the first input and the second input of the EOS/ESD protection device;

an active pull down circuit having first and second inputs respectively coupled to the first input and the output of the EOS/ESD protection device and having an output coupled to the second input of the EOS/ESD protection device, the active pull down circuit being constructed and arranged to reduce the voltage across the second input and the output of the EOS/ESD protection circuit to approximately zero at a predetermined time after the occurrence of the EOS/ESD event;

wherein the EOS/ESD protection device is an NMOS device, and wherein the first input, the second input and the output of the EOS/ESD protection device respectively correspond to the drain, gate and source of the NMOS device.

20. The EOS/ESD protection circuit of claim 19, wherein the active pull down circuit includes:

a switch having a first input coupled to the gate of the NMOS device, a second input, and an output coupled to the source of the NMOS device, the switch being constructed to provide a substantially short circuit between the first input and the output of the switch in response to a control signal at the second input of the switch; and a timer circuit having first and second inputs respectively coupled to the drain and source of the NMOS device and an output coupled to the second input of the switch to provide the control signal at the predetermined time.

21. The EOS/ESD protection circuit of claim 20 in combination with the integrated circuit.

22. An EOS/ESD protection circuit for protecting an integrated circuit from an EOS/ESD event occurring across first and second pads of the integrated circuit, the EOS/ESD protection circuit comprising:

an EOS/ESD protection device having a first input to couple to the first pad, having an output to couple to the second pad, and having a second input, the EOS/ESD protection device being constructed to conduct current from the first input to the output upon occurrence of the EOS/ESD event;

a capacitor coupled between the first input and the second input of the EOS/ESD protection device;

an active pull down circuit having first and second inputs respectively coupled to the first input and the output of the EOS/ESD protection device and having an output coupled to the second input of the EOS/ESD protection device, the active pull down circuit being constructed and arranged to reduce the voltage across the second input and the output of the EOS/ESD protection circuit to approximately zero at a predetermined time after the occurrence of the EOS/ESD event;

wherein the active pull down circuit includes:

a switch having a first input coupled to the second input of the EOS/ESD protection device, a second input, and an output coupled to the output of the EOS/ESD protection device, the switch being constructed to provide a substantially short circuit between the first input and the output of the switch in response to a control signal at the second input of the switch; and a timer circuit having first and second inputs respectively coupled to the first input and the output of the EOS/ESD protection circuit and an output coupled to the second input of the switch to provide the control signal at the predetermined time.

23. An EOS/ESD protection circuit for protecting an integrated circuit from an EOS/ESD event occurring across first and second pads of the integrated circuit, the EOS/ESD protection circuit comprising:

an EOS/ESD protection device having a first input to couple to the first pad, having an output to couple to the second pad, and having a second input, the EOS/ESD protection device being constructed to conduct current from the first input to the output upon occurrence of the EOS/ESD event;

a capacitor coupled between the first input and the second input of the EOS/ESD protection device; and means for maintaining a non-zero voltage across the second input and the output of the EOS/ESD protection device at a first predetermined level for a predetermined period of time after the occurrence of the EOS/ESD event.

24. The EOS/ESD protection circuit of claim 23, further comprising means for maintaining the voltage across the second input and the output of the EOS/ESD protection device at a second predetermined level after the predetermined period of time.

25. The EOS/ESD protection circuit of claim 24, wherein the EOS/ESD protection device is an NMOS device, and wherein the first input, the second input and the output of the EOS/ESD protection device respectively correspond to the drain, gate and source of the NMOS device.

26. The EOS/ESD protection device of claim 25 in combination with the integrated circuit.

27. The EOS/ESD protection circuit of claim 23, wherein the EOS/ESD protection device is an NMOS device, and wherein the first input, the second input and the output of the EOS/ESD protection device respectively correspond to the drain, gate and source of the NMOS device.

28. The EOS/ESD protection circuit of claim 27, wherein the NMOS device has a snapback time, and wherein the predetermined period of time is approximately equal to the snapback time of the NMOS device.

29. A method for protecting an integrated circuit having first and second pads from an EOS/ESD event across the first and second pads, the method including steps of:

providing an EOS/ESD protection device having a first input coupled to the first pad, having an output coupled to the second pad, and having a second input, the EOS/ESD protection device being constructed to conduct current from the first input to the output upon occurrence of the EOS/ESD event;

upon the occurrence of the EOS/ESD event, setting a voltage across the second input and the output of the EOS/ESD protection device to a first predetermined non-zero voltage level for a predetermined period of time.

30. The method of claim 29, further comprising a step of:

setting the voltage across the second input and the output of the EOS/ESD protection. device at a second predetermined level after the predetermined period of time.

31. The method of claim 30, wherein the step of providing includes a step of providing an NMOS device such that the first input, the second input and the output of the EOS/ESD protection device respectively correspond to the drain, gate and source of the NMOS device.

32. The method of claim 31, wherein the NMOS device has a snapback time, and wherein the predetermined period of time corresponds to the snapback time of the NMOS device.

33. The EOS/ESD protection circuit of claim 1, wherein the predetermined voltage is between 1.5 and 4 volts.

34. The EOS/ESD protection circuit of claim 3, wherein the EOS/ESD event has a pulse duration, and wherein the predetermined time is less than the pulse duration.

* * * * *